United States Patent [19]

Fettig

[11] 4,136,937
[45] Jan. 30, 1979

[54] MICROFILM READER

[75] Inventor: Lyle A. Fettig, Oconomowoc, Wis.

[73] Assignee: Data View, Inc., Menomonee Falls, Wis.

[21] Appl. No.: 626,685

[22] Filed: Oct. 29, 1975

Related U.S. Application Data

[63] Continuation-in-part of Ser. No. 546,154, Jan. 31, 1975, abandoned.

[51] Int. Cl.² .................. G03B 23/08; G03B 21/28
[52] U.S. Cl. .................................. 353/27 R; 353/8
[58] Field of Search .................. 353/27 R, 27 A, 78, 353/77, 74

[56] References Cited

U.S. PATENT DOCUMENTS

| 2,746,344 | 5/1956 | Pratt et al. | 353/78 |
| 2,933,978 | 4/1960 | Rosenthal | 353/78 |
| 3,442,581 | 5/1969 | Smitzer et al. | 353/27 |
| 3,733,121 | 5/1973 | Smitzer | 353/27 |
| 3,743,399 | 7/1973 | Smith | 353/27 R |

Primary Examiner—Steven L. Stephan
Attorney, Agent, or Firm—Andrus, Sceales, Starke & Sawall

[57] ABSTRACT

A microfiche reader with a compact housing having an upper housing portion or hood and a lower housing portion or base, has an upper surface which supports a fiche carrier in a projection plane. The hood has a lower surface spaced above the base to provide a work area for manipulation of the microfiche carrier. To further minimize size and overheating of the microfiche, a light source, condensing lens and mirror form a preassembled module which is located in the hood beneath and behind the projection screen and above the film plane. The projection lens and focus adjustment are carried by a slide or drawer which is movable between a position in registry with the light beam during use to a withdrawn position for easy access for changing lenses. The use of the light source module in the hood and the projection lens in the base enables the use of various size screen hoods on the same base without changing mirror angles in the base. Location of the light source in the hood also facilitates cooling of the lamp which affords considerably longer lamp life than in prior art readers. The reader also includes a carriage arrangement for guided movement of the microfiche and the transparent fiche carrier plates along first and second transverse axes which facilitates orientation and location of the selected images and maintains a proper squared relationship of the selected image on the screen. The carriage is easily removed from the reader without using any tools.

13 Claims, 17 Drawing Figures

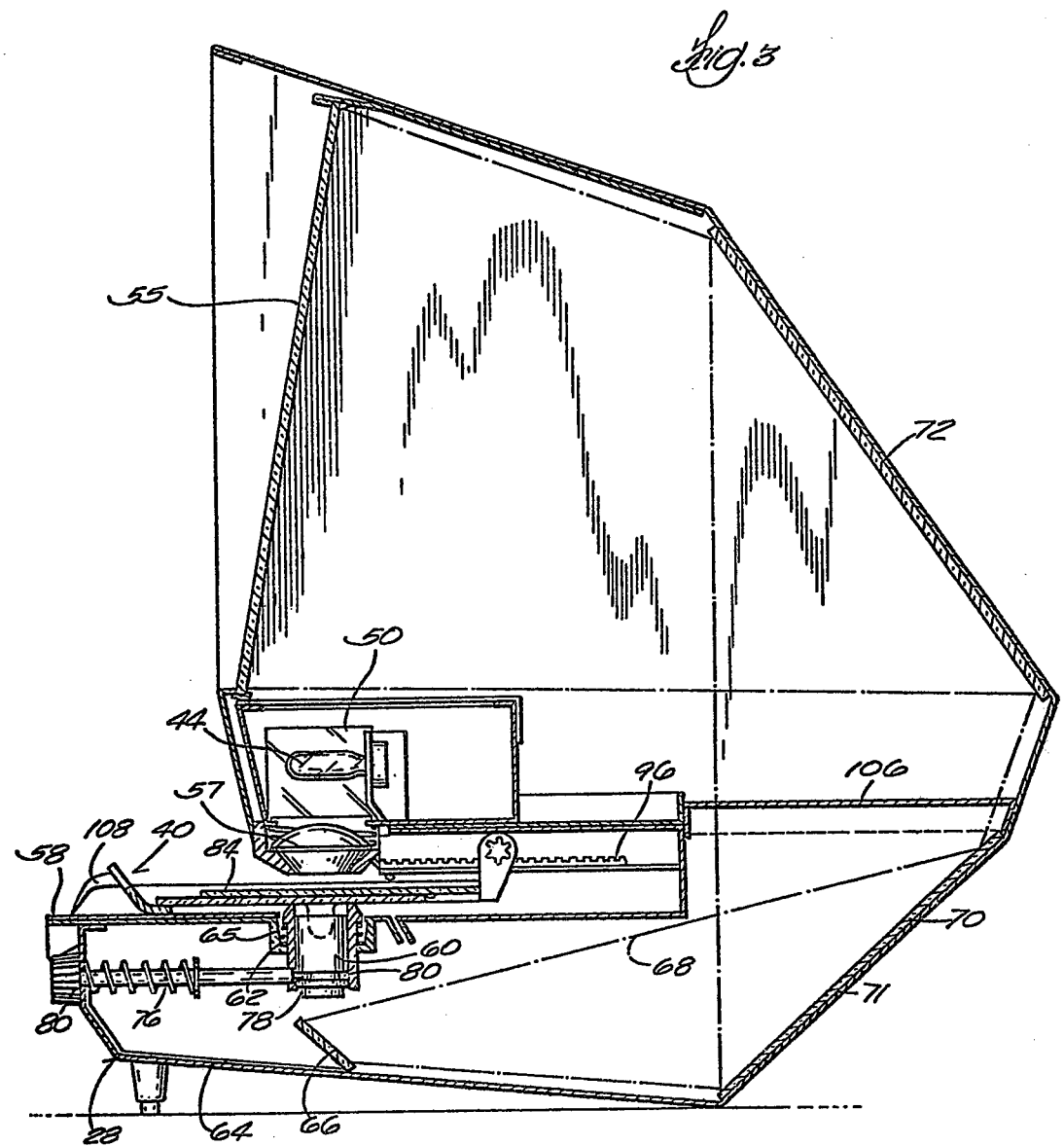

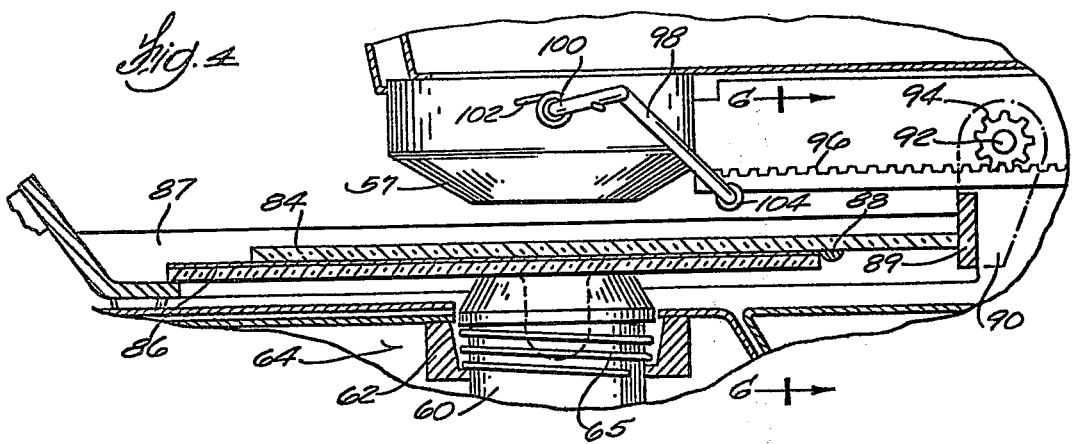
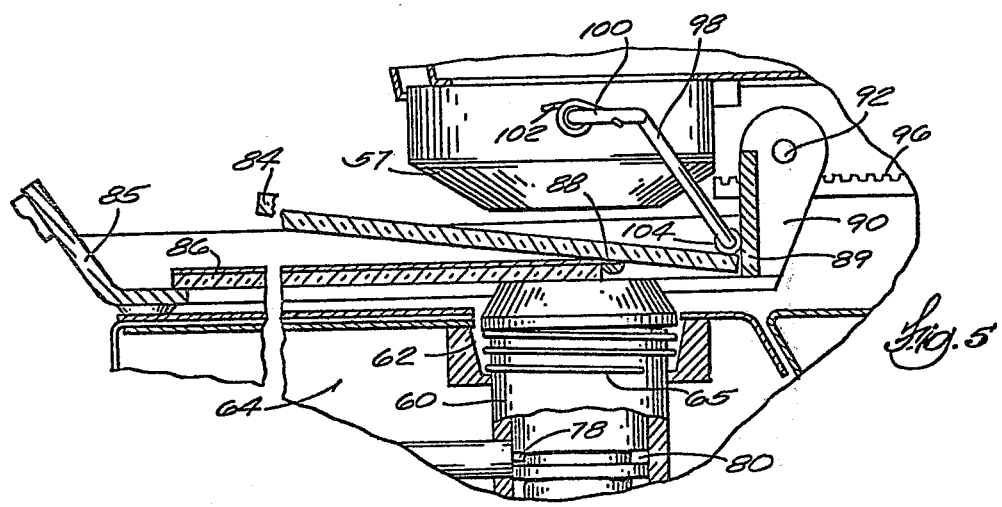
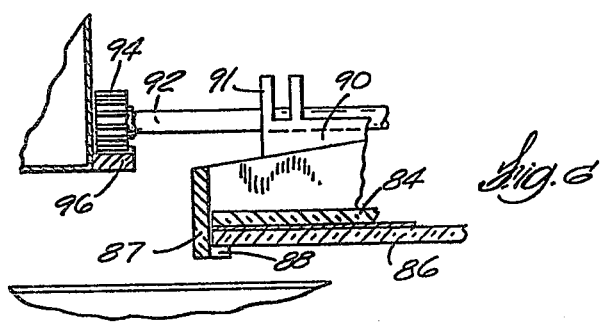

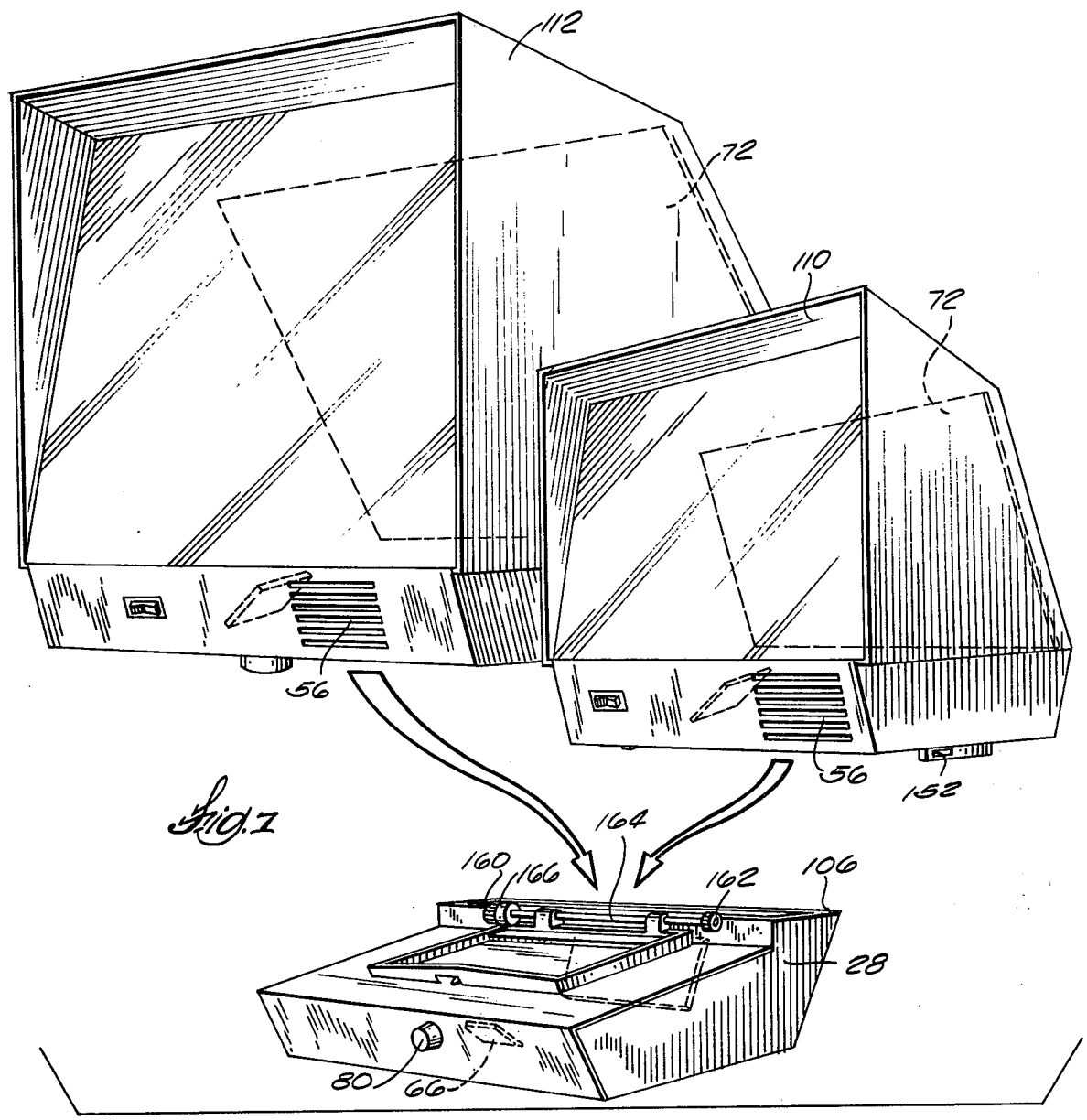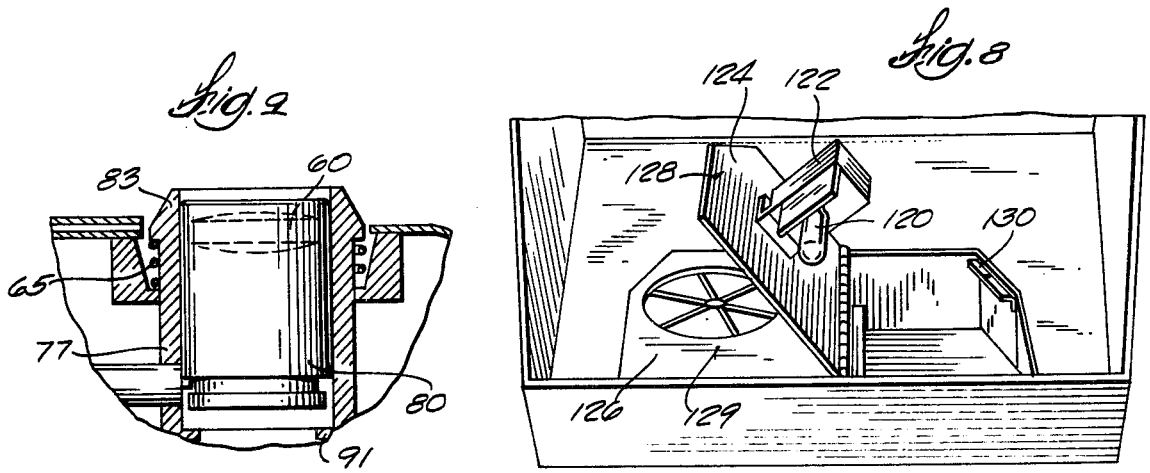

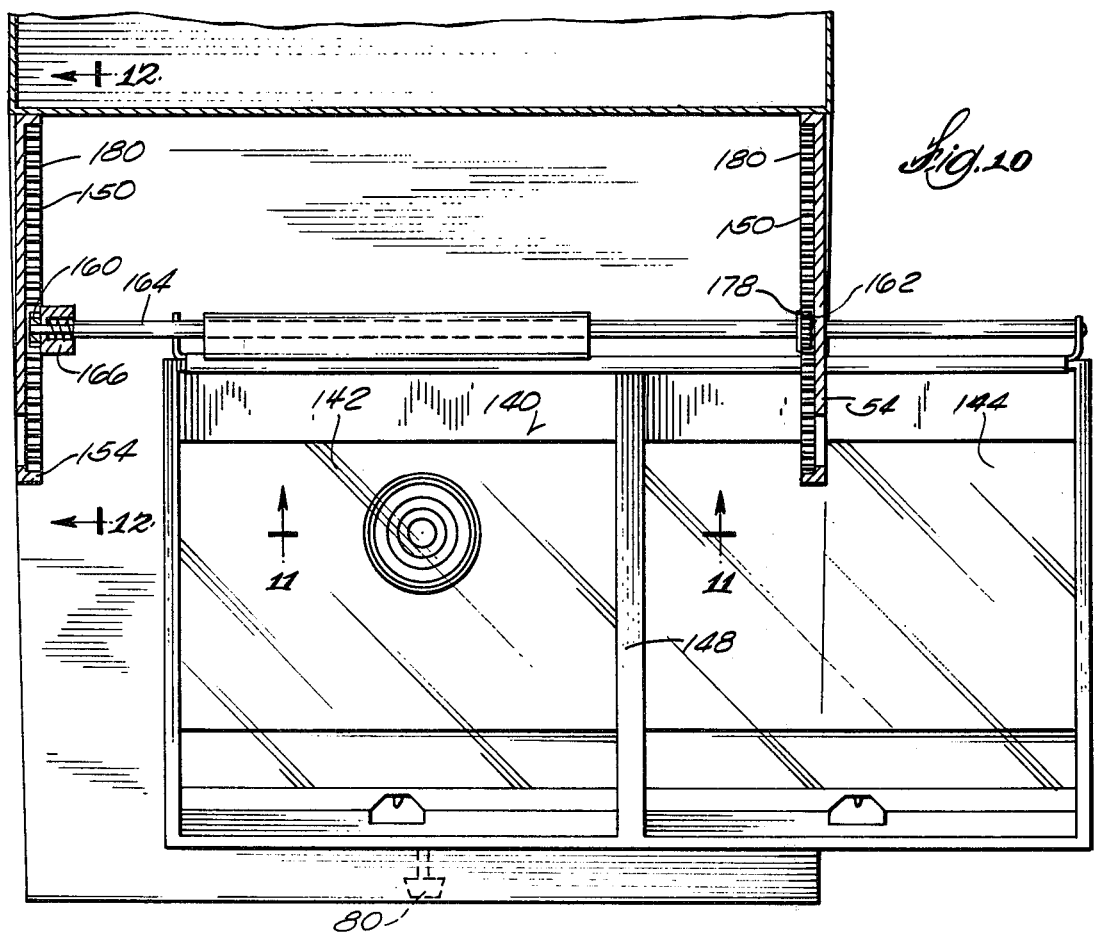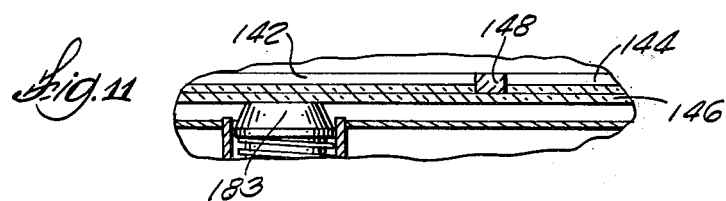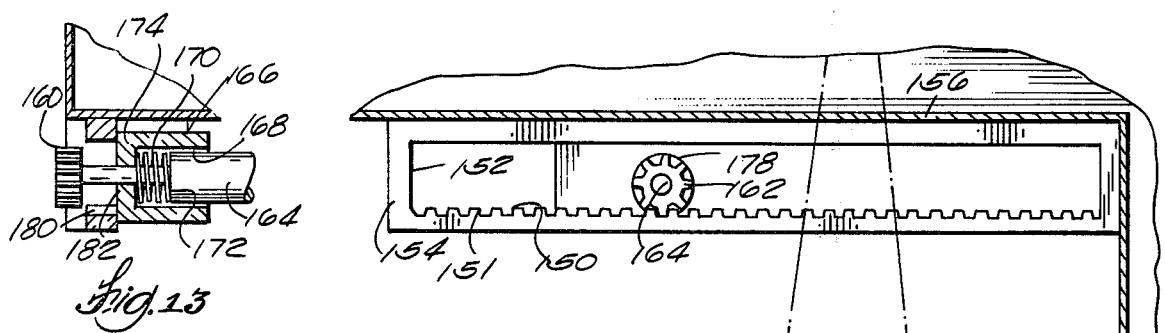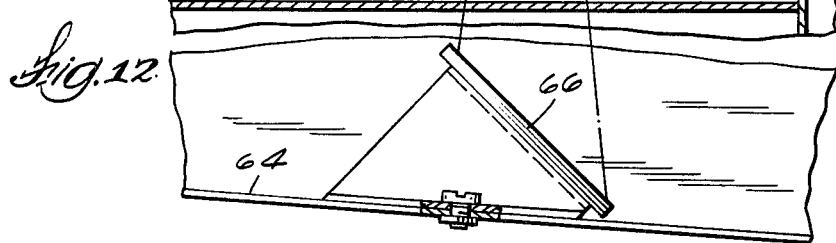

MICROFILM READER

CROSS REFERENCE TO RELATED APPLICATION

This application is a continuation-in-part application of application Ser. No. 546,154, filed Jan. 31, 1975, now abandoned.

SUMMARY OF THE INVENTION

The invention provides a compact microfiche reader with the components readily accessible for service and adjustment. The housing includes an upper housing portion or hood which includes a projection screen and a projection light and lens module which is easily removed from the hood after removing the screen. A fan can also be supported on the light module chassis. Location of the projection lamp above the projection plane prevents overheating of the microfiche and enables use of various size hoods and screens on a common base. The projection lens and focus adjustment are located beneath the projection plane defined by the upper surface of the lower housing and are contained in a pull-out drawer for ease in assembly, service and replacement. The projection lens slidingly interfits in a lens carrier or holder which is spring biased upwardly for engagement with the bottom glass of the fiche carrier. The lens carrier is thus in constant contact with the fiche carrier to maintain good focus. The protection lens is merely dropped in the carrier and easily lifted from the carrier for replacement. Inasmuch as the projection lens carrier rides on the bottom glass of the fiche carrier, there is no problem of movement of a double fiche carrier with two independently pivoted upper glass plates past the lens because of the gap between the upper plates as with the prior art readers having a projection lens which rides on the upper glasses of the fiche carrier.

The invention also includes a microfiche carrier which is easily removed from the reader without tools and which affords guided movement about first and second transverse axes to facilitate proper orientation of the microfiche with the projection screen. The carrier includes a pair of transparent plates with the carrier frame connected to slides which are movable on a shaft. The shaft is provided with pinion gears which are in mesh with spaced toothed racks supported in the hood. Movement of the plates with the slide along the shaft provides movement of the plates laterally about a first axis parallel with the screen, and movement of the shaft fore and aft causes movement of the pinions along the racks and guided movement of the carrier along a second axis perpendicular to the first axis. A spring loaded bushing on the gear axis bears agaonst the gear rack to positively locate the gear axis and facilitate removal of the fiche carrier.

Further objects, advantages and features of the invention will become apparent from the following disclosure.

DESCRIPTION OF THE DRAWINGS

FIG. 3 is an enlarged sectional view of the reader shown in FIG. 1.

FIG. 4 is an enlarged fragmentary sectional view of a portion of FIG. 3 showing the microfiche carrier assembly in a closed position.

FIG. 5 is a view similar to FIG. 4 showing the microfiche carrier in an open position.

FIG. 6 is a sectional view along line 6—6 of FIG. 4.

FIG. 7 is a perspective view of a reader base and a perspective view of interchangeable hoods for the common base.

FIG. 8 is a fragmentary perspective view of the screen hood and a modified embodiment of the illumination module.

FIG. 9 is a sectional view of the projection lens shown in FIG. 5.

FIG. 10 is a plan view of a dual fiche carrier.

FIG. 11 is a sectional view along line 11—11 of FIG. 10.

FIG. 12 is an enlarged view along line 12—12 of FIG. 10.

FIG. 13 is an enlarged view of a fiche carrier gear and rack with the spring compressed during removal of the gear from the rack.

DESCRIPTION OF PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
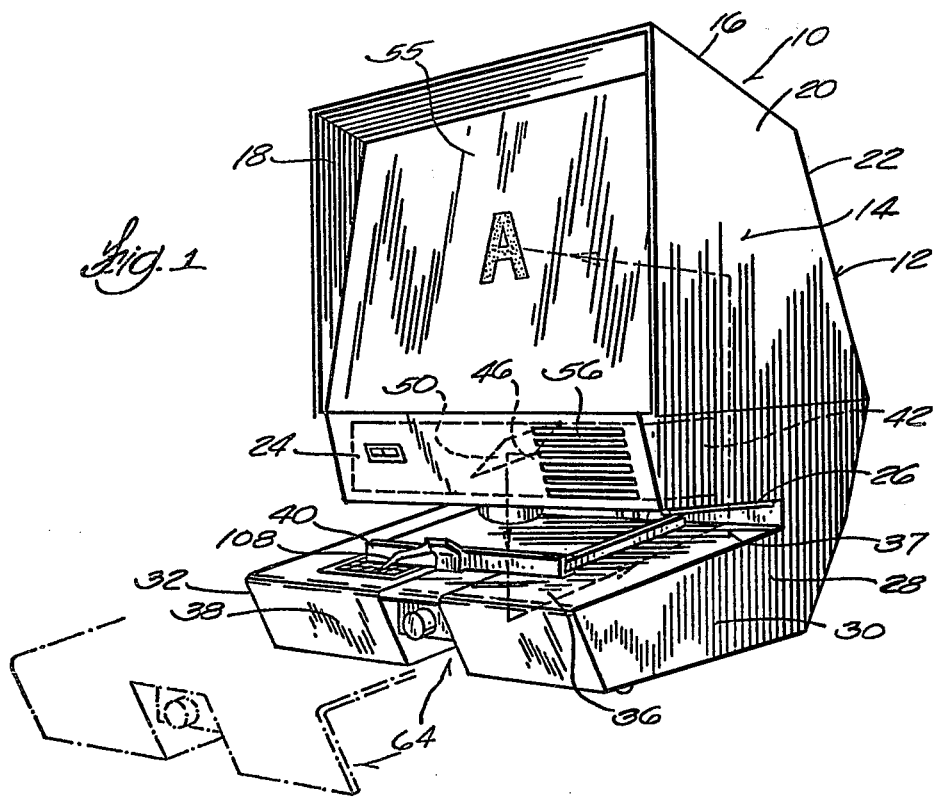
FIG. 1 is a perspective view of a microfiche reader in accordance with the invention.

In the drawings, FIG. 1 shows a microfiche reader 10 which includes a housing generally designated 12 which includes an upper housing portion 14 which includes a top wall 16, opposed spaced side walls 18, 20, rear wall 22, front wall 24, and lower wall 26. The housing 12 also includes a lower housing portion or base 28, with side walls 30, 32 upper wall portion 36, and forward wall portions 38. The lower wall portion 26 is spaced from the wall portion 36 to provide a work area 37 for the microfiche carrier 40 subsequently described in detail.

Figure 2:
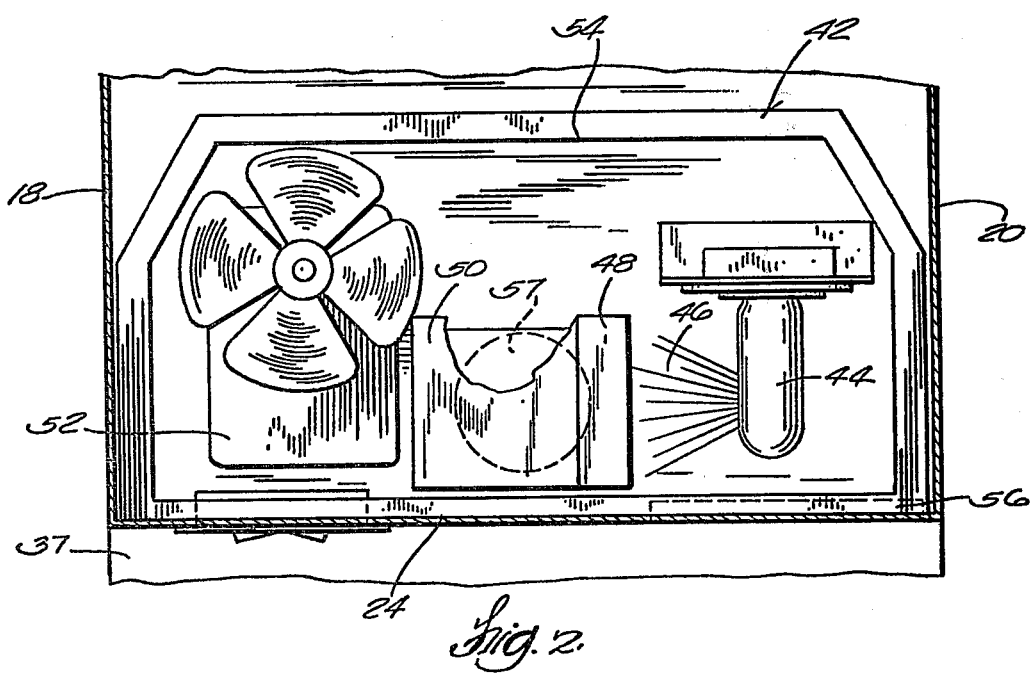
FIG. 2 is an enlarged plan view of the projection light and fan assembly with the housing in section.

FIG. 2 shows a projection lamp and fan assembly 42 which is contained interiorly of the wall 24 and between the side walls 18 and 20. The projection light 44 provides a horizontal light beam indicated by ray 46 (FIG. 1), which passes through a first condenser lens 48 and which is reflected downwardly by a mirror 50. A fan 52 (FIG. 2) can be employed to facilitate dissipation of heat. The fan 52 draws air through a louvered vent 56 to cool the bulb. The air is exhausted through a vent in the rear (not shown). The fan 52, mirror 50, condenser lens 48 and light 44 are attached to a chassis 54 which can readily be removed from the upper housing portion by removal of the projection screen 55. A second condenser lens 57 is located beneath the mirror 50 (FIG. 3).

The surface 58 (FIG. 3) of the lower housing portion 28 provides a support for the microfiche carrier assembly 40 which is slideably supported on the surface 58. The projection lens 60 is carried in a recess 62 in a slide or drawer 64 which is supported for movement in the lower housing assembly between an advanced position as shown in full lines in FIGS. 1 and 3 and the dotted line withdrawn position shown in FIG. 1. A spring 65 (FIG. 9) supports the weight of the projection lens 60 and urges the lens carrier 83 into contact with the microfiche carrier assembly 40. The spring 65 maintains the lens carrier 83 in continual contact with the lower glass 86 (FIG. 5) of the fiche carrier and thus, the lens remains in constant focus as the fiche carrier glides over the lens carrier 83. The lens housing 81 is sized to smoothly fit in the bore 87 of the lens carrier 83. The lens housing 81 can easily be dropped into the carrier. A shoulder 91 and the projection 78 keeps the lens housing from dropping from the carrier 83. The lens housing 81 can be removed for changing lenses merely by pushing up on the housing 81 from beneath the carrier 83.

A mirror 66 beneath the projection lens 60 deflects the light in a path diagrammatically shown by ray 68 to a mirror 70 supported by a lower housing wall 71 which deflects the light to a mirror 72 in the upper housing which displays the image on the projection screen 55.

The focus control for adjusting the vertical position of the projection lens 60 is in the form of a shaft 76 which has a non-concentric projection 78 engaged in an annular groove 80 in the projection lens housing 81. The shaft 76 extends through an opening 77 in the carrier 83 to afford engagement with groove 80. Rotation of the knob 80 moves the projection 78 in an arc which raises and lowers the projection lens 60.

The carrier assembly 40 is best shown in FIGS. 3, 4, 5 and 6 and includes a frame 85, an upper transparent plate 84 and a lower transparent plate 86 supported by the frame 85. Means are provided for separating the upper plate from the lower plate upon withdrawal of the carrier assembly. In the disclosed construction the means is in the form of a fulcrum 88 in the form of two projections on the side members 87 of frame 85. The side members 87 are connected to a bracket 89 having spaced upstanding tabs 90 which have apertures 91 (FIG. 6) which are slideably supported on shaft 92 to provide guided movement of the lower and upper plates 84 and 86 in a direction laterally and parallel with the projection screen.

Fixed to the shaft 92 are two pinion gears 94 (FIGS. 4 and 6) which are in mesh with opposed toothed racks 96 fixed to the upper housing portion. Movement of the transparent plates 84, 86 fore and aft is guided by the shaft and gears 94, 96. The guided movement afforded by the slides and gears maintains the microfiche image in a squared relationship with respect to the projection screen 55.

To open or separate the upper plate 84 from the lower plate 86 shown in FIG. 5 for insertion or removal of the fiche, arm means 98 are pivotally supported at 100 to the upper housing portion and biased upwardly by torsion springs 102. The arm means 98 include a roller 104 which is displaced downwardly into engagement with the plate 84 by the bracket 89 which engages the roller 104 when the carrier assembly 40 is retracted outwardly to engage the roller 104. As the roller 104 and arms 98 are depressed, the upper plate 84 is displaced about the fulcrum 88 to separate the plates for removal and insertion of the microfiche.

The carrier 40 can be provided with an indicator or stylus 108 which cooperates with an index panel on the surface 58 to facilitate location of the desired image. Interchangeable index cards thus can be used which have a grid which corresponds to the format of the microfiche being used.

The upper housing portion 14 can be separable from the lower housing portion 28 along line 106 so that various size upper housings and projection screens can be assembled on the same base.

As a result of the location of the illumination module in the hood 14 with a vertical light path toward the fiche carrier, and the location of the projection lens in the base 28 with a relatively long light path in the base, different size hoods and screens can be used with the same illumination module and base without changing any lenses or changing the angle of any mirrors. The only change in the optical components when changing hoods is a change in the size and angle of mirror 72. FIG. 7 shows two screen hoods 110 and 112. Screen hood 110 for example, could have an 8 × 11 inch screen and hood 112, a 10 × 15 inch screen. The base 28 can receive either of these two hoods and other hood sizes such as 8 × 13; 10 × 11; 10 × 13; and 10 × 18, all conventional size screens in the trade without changing any of the components of the base and using the same illumination module. Referring to FIG. 3, for both hoods 110 and 112, the mirrors 66 and 70 remain the same and at the same angle. In the hoods 110 and 112, the angle of the mirror 72 changes, the distance from mirror 72 to mirror 70 is changed. The size of the mirrors 72 for the two hoods 110 and 112 also is different. Prior art readers which have interchangeable hoods for a common base, require different projection lenses and changes in mirror angles and light paths to accommodate differing screen sizes.

FIG. 8 shows a modified embodiment of the illumination module in which a bulb 120 is mounted on a bracket 122 carried by a hinged cover 124. In FIG. 8 the hinged cover is shown in an open position to provide ready access for replacement of the bulb. The cover 124 can be secured in a closed position generally parallel with and flush with top wall 126 of the illumination module housing 129 by screws 128 which are threaded into a flange 130. When the cover 124 is closed the housing 129 is light tight.

FIG. 10 shows a dual fiche carrier 140 with two upper transparent glasses 142 and 144 which are each supported on a common lower transparent glass 146 which spans both glasses 142, 144. Each of the glass plates 142, 144 are fulcrumed to the lower plate 146 as shown in FIGS. 4 and 5, for a single fiche carrier assembly.

The overall arrangement with the illumination module or light source in the hood and projection lens in the base is particularly advantageous when using a dual fiche carrier 140 inasmuch as there is no difficulty in shifting the dual fiche carrier from one side to the other, which problem is experienced by prior art readers in which the projection lens bears against the upper flats or glass plates. In view of the fact that the upper plates are independent there is generally a protrusion or rib, such as 148, which engages or bumps against the projection lens when moving the carrier from the left to right. As shown in FIG. 11, the projection lens carrier 83 bears against the undersurface glass plate 146 rather than the upper plates 142, 148 and thus, there is no interference caused by engagement of a rib 148 or the edges of the upper plates 142, 144 during movement from left to right of the fiche carrier as with prior art devices.

FIGS. 10, 12 and 13 also show a modified embodiment of the fiche carrier guidance assembly. FIG. 12 shows the gear rack 150 which is located on the inside edge 151 of the opening 152 in a generally rectangular frame 154. Two frames 154 are connected to the hood 156. The gears 160, 162 (FIG. 10) are fixed to a shaft 164. A bushing or sleeve 166 (FIGS. 10, 13) is provided with a counter-bore 168 which receives a spring 170 which bears against the end 172 of the shaft 164 and against the base 174 of the sleeve 166. The other of the shaft 164 is provided with a shoulder or washer 178 which bears against the side surface 180 of the gear rack frame 154. The surface 182 of the sleeve 166 bears against the side surface 180 of the other gear rack frame 154 to maintain the gears in positive positioning in mesh with the gear racks 150. To remove the fiche carrier 140 from the hood, the spring 170 is manually compressed as shown in FIG. 13 to free the gear 162 from its rack. The fiche carrier then is shifted at an angle for removal.

Figure 14:
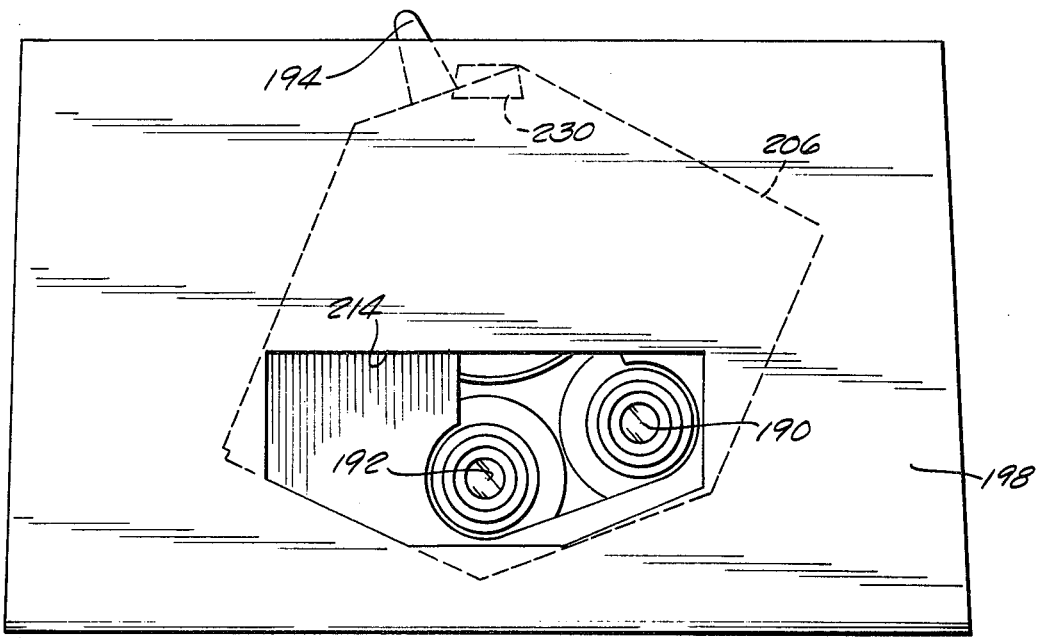
FIG. 14 is a plan view of a dual projection lens module in accordance with the invention.
Figure 15:
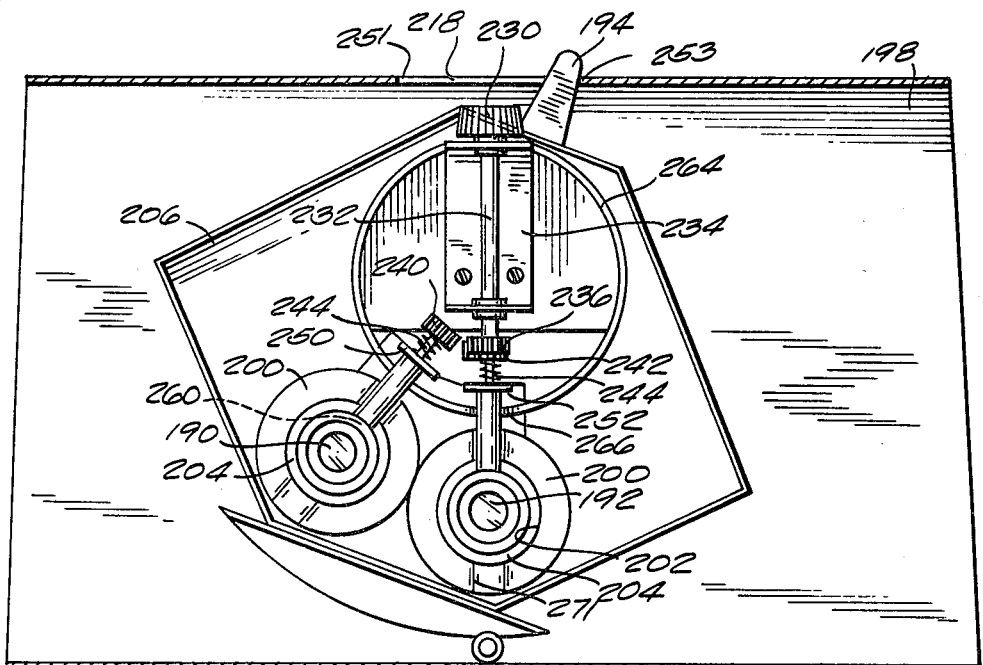
FIG. 15 is a bottom view of the dual lens module shown in FIG. 14.
Figure 16:
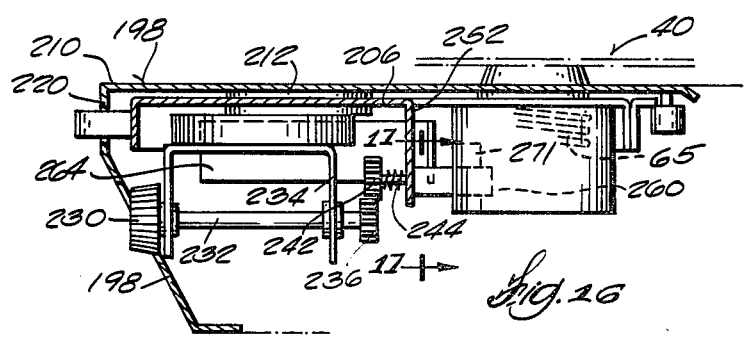
FIG. 16 is a fragmentary sectional view of the lens module shown in FIGS. 14, 15.

The FIGS. 14, 15 and 16 show a dual projection lens assembly which can contain two different projection lenses 190 and 192 of different magnifications. The lenses are easily switched into the operative position by a selector lever 194.

All the components of the dual lens assembly are mounted on a pull-out chassis or drawer 198 which interfits into the reader base 28 in the same manner as the single lens module shown in FIG. 1. The lenses 192 and 190 are mounted as described and shown in FIG. 9. Cylindrical metal blocks 200 have bores 202 which receive plastic lens carriers 204. The blocks 200 are fixed to a sub-chassis 206 which is pivotally connected to the deck 210 for rotation about a pivotal axis 212. The lever 194 is connected to the chassis 206 to afford movement of the lenses to the operative position in registry with the light source.

As shown in FIG. 14, the lense 192 is in position for use with the lens exposed through an opening 214 in the upper deck 210 of the chassis 206. The lever 194 extends through a slot 218 in the front 220 of the drawer for manual access by the user.

To focus the lenses, a focusing knob 230 is connected to a shaft 232 and is rotatably supported in openings in a bracket 234 for rotation about a fixed axis. The shaft 232 is provided with a gear 236 which is selectively engageable with gears 240, 242 (FIG. 15) secured to shafts 244, which are supported by brackets 250, 252 which are connected to and depend from the chassis 206. As shown in FIG. 15, gear 242 which controls the focus for lens 192 is in mesh with the gear 236 on the focus shaft 232. Movement of the selector lever 194 to the left of the FIG. 15 position will disengage the gear 242 and will engage gear 240. The edges 251, 253 of slot 218 constitute stops to limit movement of the selector lever 194 and thus the chassis to properly register the lenses with the light path.

The shafts 244 extend through apertures in the plastic lens carriers 204 and are provided with axially off-set projections 260 which engage an annular groove in the lens housings 81 to afford vertical movement of the lenses for focusing purposes. The lenses are spring biased upwardly as shown in FIGS. 3 and 9 to continual contact with the undersurface of the fiche.

Figure 17:
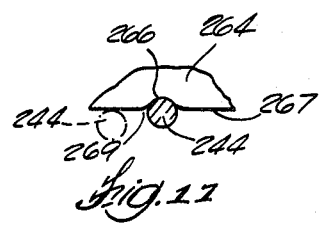
FIG. 17 is a sectional view along line 17—17 of FIG. 16.

Means are provided to lower the lens carriers 204 for the lens not in use so that only one lens carrier is contacting the fiche carrier 40 at one time so that the fiche carrier is easily shifted during use. In the disclosed construction the means includes a depending annular flange 264 which is connected to the chassis 206 and which has a notch 266 (FIG. 17) which engages the shafts 244. The springs 65 which bias the lens carriers 83 upwardly also bias the shafts 244 upwardly to ride on the edge 267 of the flange and cause the shafts 244 to snap into the notch 266 when the lens is in registry with the light path. When the selector lever 194 is moved cam surfaces 269 which define the edges of the notch, cam and displace the shaft from the notch to ride on the edge 267 with the lens carrier 83 displaced downwardly free of the fiche carrier 40. Slots 271 in the lens carriers 83 allow the shafts 244 to be shifted vertically.

The advantages of the microfiche reader construction disclosed herein are numerous. The location of the illumination module in the hood behind the screen facilitates the overall modularity afforded by various of the components. In addition, it forms the basis for an entire family of microfiche or microfilm readers using a common base with various size hoods and projection screens. This, of course, results in tremendous cost savings to the user of this equipment. Particularly, in view of the fact that common illumination modules and projection lens assemblies can be used for the various hood sizes. If the user wishes to go to a larger screen, he merely can purchase the larger hood size and use all other components which are contained in his initial reader. This modularity also affords easy access to the parts and removal for service.

Other important advantages of the invention include the fiche carrier floating on the lens to provide a flatness of field, less focus problems and in which the lens is always on the same glass in a dual lens carriage unit which is easily substituted for the single carrier unit. The use of illumination modules in hoods also enables use of a compact light path which reduces the overall size of the units for a particular size screen. Location of the illumination module in the hood also provides a substantial enclosure for heat dissipation which considerably prolongs lamp life as compared with the light source in the base. Film plane temperature problems are completely eliminated.

Other features of the invention include the drop-in-lens which are easily interchanged without tools, and without changes or adjusting condenser lenses.

A further advantage of the location of the projection lens beneath the film or fiche carrier, is to locate the focusing knob at a level close to the desk or supporting surface so that focusing can be done with the hand resting on the desk.

Various of the features of the invention are found in the following claims.

I claim:

1. In projection apparatus having a housing including a housing surface, means defining a surface for supporting upper and lower carrier plates in a projection plane and means for projecting a selected image from an image bearing medium containing a plurality of images, the improvement for retaining and orienting the medium for display of selected images comprising a frame for supporting said plates, connecting means for connecting said frame to said housing to afford guided movement of said plates along first and second transverse axes, and to afford withdrawal of said frame from said housing, said connecting means including a shaft having rotary gear means, linear gear means supported on said housing and having teeth located in mesh with said rotary gear means, releasable means axially locating said shaft with said rotary gear means in alignment with said linear gear means and said rotary gear means being supported on said linear gear means to guide movement of said plates along said first axis, said shaft being movable axially to disengage the rotary gear means from the linear gear means for release of said frame from said housing, and slide means connecting said shaft to said frame to provide guided movement of said plates parallel to the axis of said shaft along said second axis.

2. In projection apparatus having a housing including a housing surface, means defining a surface for supporting upper and lower carrier plates in a projection plane and means for projecting a selected image from an image bearing medium containing a plurality of images, the improvement for retaining and orienting the medium for display of selected images comprising a frame for supporting said plates, connecting means for connecting said frame to said housing to afford guided movement of said plates along first and second transverse axes, and to afford withdrawal of said carriage from said housing, said connecting means including a shaft having rotary gear means, linear gear means supported on said housing and having teeth projecting upwardly and in mesh with said rotary gear means connected to the ends of the shaft, said rotary gear means being supported on said linear gear means to guide movement of said plates along said first axis, and slide means connecting said shaft to said frame to provide guided movement of said plates parallel to the axis of said shaft along said second axis, fulcrum means associated with said upper and lower plates, arm means pivotally supported on said housing above said plates for movement between a first position spaced above and free of contact with said upper plate and a second position engaged with said upper plate, means for biasing said arm means into said first position, and abutment means associated with said plates and engageable with arm means upon withdrawal of said plates to displace said arm means from said first position to said second position against said biasing means to cause engagement of said arm means with said upper plate to cause displacement of said upper plate about said fulcrum means to separate said plates for insertion and removal of the image bearing medium.

3. In projection apparatus having a housing including a housing surface, a means defining a surface for supporting upper and lower carrier plates in a projection plane and means for projecting a selected image from an image bearing medium containing a plurality of images, the improvement for retaining and orienting the medium for display of selected images comprising a frame for supporting said plates, connecting means for connecting said frame to said housing to afford guided movement of said plates along first and second transverse axes, and to afford withdrawal of said carriage from said housing, said means including a shaft having rotary gear means, linear gear means supported on said housing and having teeth projecting upwardly and in mesh with said rotary gear means, said rotary gear means being supported on said linear gear means to guide movement of said plates along said first axis, and slide means connecting said shaft to said frame to provide guided movement of said plates parallel to the axis of said shaft along said second axis and wherein said linear gear means comprises two gear racks and said gear racks have side faces and including a shoulder on one end of said shaft engageable with one of said side faces and a bushing having an end wall with an aperture, said other shaft end having a second shoulder and a reduced portion extending through said bushing aperture and a spring located between said second shoulder and said end wall to bias said end wall against a side face of a gear rack.

4. A microfiche reader comprising a base portion with an upper surface for supporting upper and lower transparent plates carrying an image bearing medium in a film plane, a hood detachably connected to said base including a projection screen and a lower wall spaced upwardly from said film plane, said hood including a forward wall portion and side walls, a projection light and lens assembly detachably mounted in said hood inwardly of said screen, said light bulb being oblong and having a longitudinal axis oriented parallel to the film plane and providing a generally horizontal first light beam above the base and within the hood and parallel to said screen and said film plane and at 90 degrees with respect to the longitudinal axis of said light bulb, and a mirror for changing the direction of said first light beam from said projection light to a second light beam in a generally vertical path to intercept said film plane, and a projection lens supported in said base and located below said film plane and beneath said screen and mirrors in said base to return the light beam to said hood and said screen.

5. Projection apparatus in accordance with claim 4 including a condenser lens in said hood in optical association with said light source.

6. Projection apparatus in accordance with claim 4 including a slot in said base beneath said film plane, and a slide carrying said projection lens, said slide being movable between advanced and retracted positions for registry with said generally vertical light beam in the advanced position and for lens access in said retracted position.

7. Projection apparatus in accordance with claim 6, a projection lens carrier, and wherein said slide has a tapered recess to support said projection lens carrier and afford axial adjustment of said carrier, and biasing means to urge said lens carrier against said lower plate with said tapered recess affording lateral displacement of said lens carrier to enable continual uniform contact of the lens carrier with said lower plate to maintain constant focus during movement of the plates.

8. Projection apparatus comprising a hood having a projection screen, said hood including an upwardly and forwardly sloped rear wall and a bottom wall, a base, means for detachably connecting said base to said hood, said base having an upper surface spaced from said bottom wall to provide a work space, said upper surface of said base supporting a microfiche carrier in a projection plane, said base further including a rear wall inclined rearwardly and upwardly, said two rear walls supporting first and second mirrors parallel to said two rear walls and including a light source in said hood behind said screen and above said projection plane providing a first light path parallel to said screen and said projection plane, a third mirror in said hood providing a second light path at right angles to said first light path which intercepts said projection plane, a fourth mirror in said base which provides a third light path at right angles with said second light path which intercepts said first mirror which provides a fourth light path which intercepts the second mirror, with said second mirror providing a fifth light path which displays the image from an image bearing medium on said projection screen.

9. Projection apparatus in accordance with claim 8 including a plurality of hoods attachable to said base, each of said hoods being of different sizes and having different size projection screens and wherein each of said hoods have said second mirrors with said second mirrors in hoods of different sizes being at different angles to cooperate with said other mirrors to provide said fifth light path for displaying the image on a projection screen.

10. Projection apparatus comprising a hood having a projection screen and a base, a projection light, cooling fan and condenser lens assembly, said assembly including a separate light confining housing mounted in the hood and substantially completely enclosing said projection light, fan and condenser lens, said housing having a housing cover in one wall of the housing, a bracket on said cover, means releasably mounting said projection lamp in said bracket of said cover and releasable mounting means for connecting said cover to said housing wall to afford movement of said lamp from an operative position within said housing to an access position outside of said housing for access to said lamp for removal without removing said housing and assembly from said hood.

11. Projection apparatus comprising a plurality of hoods each having a different size projection screen, and a bottom wall, a common base having an upper surface spaced from said bottom wall to provide a work space, said up upper surface supporting a microfiche carrier in a projection plane, said base further including side walls which extend upwardly above said base upper surface for connection to any of said hoods to support said hood bottom walls above said base upper surface, means for detachably connecting said hoods to said base, first and second mirrors and a common projection lamp, and mirror condenser lens assembly for each of said hoods to be supported on the bottom wall of said hoods and said mirror directing a light beam downwardly at right angles, with said projection plane behind said screen and a common projection lens supported in said common base beneath said projection plane, said base having second and third mirrors with said second mirror located to receive said light beam from said lamp, mirror and lens assembly and a fourth mirror in each of said hoods, said fourth mirror in each of said hoods being of a different size and at a different angle appropriate for the screen contained in the hood whereby said base will accommodate each of said hoods using the common light mirror and lens assembly without change or adjustment of any of said mirrors in said base.

12. A dual lens carrier for projection apparatus comprising a chassis, focusing means supported on said chassis including a first gear which rotates about a fixed axis, manual means for rotating said first gear, a sub-chassis, means for pivotally connecting said sub-chassis to said chassis for movement between first and second positions, first and second lens mounting means on said sub-chassis each supporting a projection lens for movement between advanced and retracted positions with said lens mounting means adapted to contact a fiche carrier in the advanced position and free of the fiche carrier in the retracted position, means for shifting said sub-chassis between said first and second positions, focusing shafts selectively engageable with said first gear upon movement of said chassis between said first and second chassis positions, and cam means engageable with said focusing shafts to move said lens carriers between said advanced and retracted positions upon movement of said sub-chassis between said first and second chassis positions.

13. In projection apparatus having a housing including a housing surface, means defining a surface for supporting upper and lower carrier plates in a projection plane and means for projecting a selected image from an image bearing medium containing a plurality of images, said plates being movable between a medium insertion position and an image projecting position, the improvement comprising fulcrum means associated with said upper and lower plates, arm means pivotally supported on said housing above said plates for movement between a first position spaced above and free of contact with said upper plate to afford drag free shifting of said plates for the selection of images and a second position engaged with said upper plate, means for biasing said arm means into said first position, and abutment means associated with said plates located in spaced relation to said arm means with the plates located in the image projection position, said abutment means moving into engagement with said arm means upon withdrawal of said plates from said image projecting position to displace said arm means from said first position to said second position against said biasing means to cause engagement of said arm means with said upper plate to cause displacement of said upper plate about said fulcrum means to separate said plates for insertion and removal of the image bearing medium.

* * * * *

UNITED STATES PATENT AND TRADEMARK OFFICE
CERTIFICATE OF CORRECTION

PATENT NO. : 4,136,937
DATED : January 30, 1979
INVENTOR(S) : LYLE A. FETTIG

It is certified that error appears in the above—identified patent and that said Letters Patent are hereby corrected as shown below:

Column 1, Line 54, After "bears" cancel "agaonst" and substitute therefore --- against ---;

Column 2, Line 22, After "rack." Begin new paragraph with "Fig. 14 etc.";

Column 3, Line 13, After "projection 78" cancel "keeps" and substitute therefore --- keep ---;

Column 9, Line 29, CLAIM 11  After "said" and before "upper" cancel "up".

Signed and Sealed this

Eighth Day of May 1979

[SEAL]

Attest:

RUTH C. MASON
Attesting Officer

DONALD W. BANNER
Commissioner of Patents and Trademarks